(12) United States Patent
Aitken et al.

(10) Patent No.: US 8,125,920 B2
(45) Date of Patent: Feb. 28, 2012

(54) SYSTEM AND METHOD FOR EXPORTING STRUCTURED DATA IN A NETWORK ENVIRONMENT

(75) Inventors: Paul J. Aitken, West Linton (GB);
Benoit Claise, Othee (BE); Gowri Dhandapani, Bristow, VA (US); Zhipu Jin, Milpitas, CA (US); Nagaraj Varadharajan, San Jose, CA (US); Stanford L. Yates, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 236 days.

(21) Appl. No.: 12/465,707

(22) Filed: May 14, 2009

(65) Prior Publication Data

US 2010/0226282 A1    Sep. 9, 2010

Related U.S. Application Data

(60) Provisional application No. 61/157,336, filed on Mar. 4, 2009.

(51) Int. Cl.
*G01R 31/08* (2006.01)

(52) U.S. Cl. .......................................... 370/252; 709/231

(58) Field of Classification Search .................. 370/252, 370/254; 709/224, 231
See application file for complete search history.

(56) References Cited

U.S. PATENT DOCUMENTS

| | | | |
|---|---|---|---|
| 5,291,583 A | 3/1994 | Bapat | |
| 5,737,518 A | 4/1998 | Worwood et al. | |
| 5,864,865 A | 1/1999 | Lakis | |
| 6,405,251 B1 | 6/2002 | Bullard et al. | |
| 6,694,304 B1 | 2/2004 | Sethi | |
| 6,704,780 B1 | 3/2004 | Sethi | |
| 7,120,689 B2 | 10/2006 | Gonsalves et al. | |
| 7,143,006 B2 | 11/2006 | Ma et al. | |
| 7,385,924 B1 | 6/2008 | Riddle | |
| 7,433,304 B1 | 10/2008 | Galloway et al. | |
| 7,487,541 B2 | 2/2009 | Robert | |
| 7,562,140 B2 | 7/2009 | Clemm et al. | |
| 7,580,356 B1 | 8/2009 | Mishra et al. | |
| 7,580,936 B2 | 8/2009 | Salgado | |

(Continued)

FOREIGN PATENT DOCUMENTS

CN    102124698 A    7/2011

(Continued)

OTHER PUBLICATIONS

U.S. Appl. No. 12/705,654, filed Feb. 15, 2010, entitled "System and Method for Synchronized Reporting in a Network Environment," Inventor(s): Paul J. Aitken et al.

(Continued)

*Primary Examiner* — Jung Park
(74) *Attorney, Agent, or Firm* — Patent Capital Group

(57) ABSTRACT

An apparatus is provided in one example embodiment and includes a network element configured to receive a plurality of packets. The network element is configured to couple to a module, the module being configured to generate a data record that is based on information associated with the packets and capable of being interpreted according to a template in which multiple information elements can be positioned to create a hierarchical relationship within structured data. The structured data further includes references to the information elements. The network element further including an export module configured to export the data record to a next destination.

18 Claims, 8 Drawing Sheets

U.S. PATENT DOCUMENTS

| | | | |
|---|---|---|---|
| 7,606,895 | B1 | 10/2009 | Dini et al. |
| 7,639,613 | B1 | 12/2009 | Ghannadian et al. |
| 7,788,371 | B2 | 8/2010 | Claise et al. |
| 2002/0078261 | A1 | 6/2002 | Wiles et al. |
| 2002/0091809 | A1 | 7/2002 | Menzies et al. |
| 2002/0133581 | A1 | 9/2002 | Schwartz et al. |
| 2003/0056193 | A1 | 3/2003 | Perycz et al. |
| 2003/0192047 | A1 | 10/2003 | Gaul et al. |
| 2003/0212767 | A1 | 11/2003 | Yang-Huffman |
| 2004/0105394 | A1 | 6/2004 | Martinot et al. |
| 2004/0160464 | A1 | 8/2004 | Reyna |
| 2005/0021547 | A1 | 1/2005 | Emaru et al. |
| 2006/0230060 | A1 | 10/2006 | Salgado |
| 2006/0285501 | A1 | 12/2006 | Damm |
| 2007/0112955 | A1 | 5/2007 | Clemm et al. |
| 2007/0147246 | A1 | 6/2007 | Hurley et al. |
| 2007/0192448 | A1 | 8/2007 | Sankaran |
| 2007/0206490 | A1* | 9/2007 | Altshuler et al. ............. 370/203 |
| 2007/0217425 | A1* | 9/2007 | Claise et al. ................. 370/392 |
| 2007/0274213 | A1 | 11/2007 | Stephan et al. |
| 2008/0181217 | A1* | 7/2008 | Sheppard et al. ............ 370/389 |
| 2008/0250153 | A1 | 10/2008 | Claise et al. |
| 2008/0307080 | A1 | 12/2008 | Stephan |
| 2010/0054151 | A1* | 3/2010 | Droz et al. .................... 370/253 |
| 2010/0070647 | A1* | 3/2010 | Irino et al. .................... 709/234 |
| 2010/0085891 | A1* | 4/2010 | Kind et al. .................... 370/253 |

FOREIGN PATENT DOCUMENTS

| | | |
|---|---|---|
| EP | 2255494 | 9/2010 |
| FR | 2005/034429 A1 | 4/2005 |
| WO | WO 2006/045918 A1 | 5/2006 |
| WO | WO 2010/102311 A1 | 9/2010 |

OTHER PUBLICATIONS

Claise, B., et al., "Export of Structured Data in IPFIX," IPFIX Working Group, Internet-Draft, 38 pages; Mar. 3, 2009; http://tools.ietf.org/id/draft-claise-structured-data-in-ipfix-00.txt.

Kompella, R.R. and Estan, C., "The Power of Slicing in Internet Flow Measurement," USENIX Association, Internet Measurement Conference 2005, 14 pages; 2005; http://www.usenix.org/events/imc05/tech/kompella.html.

Cisco Systems, "Netflow Services Solutions Guide," 71 pages; document created on May 9, 2001; http://www.cisco.com/en/US/products/sw/netmgtsw/ps1964/products_implementation_design_guide09186a00800d6a11.html#1031447.

Burbank, J., et al., "Network Time Protocol Version 4 Protocol and Algorithms Specification," draft-ietf-ntp-ntpv4-proto-13, IETF RFC 1305, 113 pages; Oct. 9, 2009; http://tools.ietf.org/html/draft-ietf-ntp-ntpv4-proto-13.

Franklin, Paul F., "LXI Makes Smart Instruments Possible," 4 pages; Apr. 2007; www.lxiconnexion.com.

Claise, B, "Cisco Systems Netflow Services Export Version 9," IETF RFC 3954, 31 pages; Oct. 2004; http://www.ietf.org/rfc/rfc3954.txt.

Zseby, T., et al. "IP Flow Information Export (IPFIX) Applicability," IETF RFC 5472, 29 pages; Mar. 2009; http://www.ietf.org/rfc/rfc5472.txt.

Boschi, E., et al. Reducing Redundancy in IP Flow Information Export (IPFIX) and Packet Sampling (PSAMP) Reports, IETF RFC 5473, 26 pages; Mar. 2009; http://www.ietf.org/rfc/rfc5473.txt.

Stephan, E., IP Performance Metrics (IPPM) Metrics Registry, IETF RFC 4148, 14 pages; Aug. 2005; http://www.ietf.org/rfc/rfc4148.txt.

Hancock, R., Next Steps in Signaling (NSIS): Framework, IETF RFC 4080; 46 pages; Jun. 2005; http://www.ietf.org/rfc/rfc4080.txt.

Quittek, J., "Information Model for IP Flow Information Export," draft-ietf-ipfix-info-11, 131 pages; Sep. 22, 2005; http://www.ietf.org/proceedings/65/IDs/draft-ietf-ipfix-info-11.txt.

Claise, B., "IPFIX Protocol Specification," 64 pages; Sep. 2005; http://tools.ietf.org/pdf/draft-ietf-ipfix-protocol-19.pdf.

Claise, B., "IPFIX Protocol Specification," 64 pages; Mar. 2004; http://tools.ietf.org/pdf/draft-ietf-ipfix-protocol-09.pdf.

Editors: Norseth, K.C., et al. Architecture Model for IP Flow Information Export, 35 pages; Jun. 2002/Jun. 2004; http://tools.ietf.org/wg/ipfix/draft-ietf-ipfix-architecture/draft-ietf-ipfix-architecture-03-from-02.diff.txt.

Quittek, J., et al., "Requirements for IP Flow Information Export," <draft-ietf-ipfix-reqs-07.txt>, 28 pages; Sep. 2002; http://www.ietf.org/proceedings/55/I-D/draft-ietf-ipfix-reqs-07.txt.

Calato, P., et al., "Information Model for IP Flow Information Export," draft-ietf-ipfix-info-02, 43 pages; Nov. 21, 2003; http://tools.ietf.org/pdf/draft-ietf-ipfix-info-02.pdf.

Gavalas, D, et al., "A Hybrid Centralised-Distributed Network Management Architecture," Abstract page only; Jul. 6, 1999; XP010555067; ISBN: 0-7695-0250-4; *Proceedings of the 4th IEEE Symposium on Computers and Communications (ISCC'99)*, Sharm El Sheikh, Red Sea, Egypt.

Yoon, Jeong-Hyuk, et al., "Development of SNMP-XML Translator and Gateway for XML-Based Integrated Network Management," 18 pages; *Int. J. Network Mgmt* 2003; 13: 000-000 (DOI: 10.1002/nem.478); http://dpnm.postech.ac.kr/papers/IJNM/03/xml-translator-ijnm03.pdf.

Imamura, Takeshi, et al., Mapping Between ASN.1 and XML,: 22 pages and one Abstract page; Jan. 8-12, 2001 IEEE Conference, San Diego, CA; Print ISBN: 0-7695-0942-8; http://www.trl.ibm.com/projects/xml/xss4j/docs/RT0362.pdf.

International Search Report for PCT/FR Application No. PCT/FR2004/002271, dated Feb. 28, 2005; 6 pages.

English translation of "PCT Written Opinion of the International Searching Authority" dated Mar. 27, 2006 (5 pages), French International Preliminary Report on Patentability (1 page), and Written Opinion (5 pages) dated Mar. 27, 2006 for PCT/FR2004/002271.

Gavalas, D, et al., "A Hybrid Centralised-Distributed Network Management Architecture," pp. 434-441, Jul. 6, 1999; XP010555067; ISBN: 0-7695-0250-4; *Proceedings of the 4th IEEE Symposium on Computers and Communications (ISCC'99)*, Sharm El Sheikh, Red Sea, Egypt.

Wikstrom, C., "Processing ASN.1 Specifications in a Declarative Language," pp. 164-173; Software Engineering for Telecommunications Systems and Services, Mar. 30-Apr. 1, 1992 Eighth Internation Conference.

Kobayashi et al., "Managed Objects for IPFIX Concentrator," IPFIX Working Group, Mar. 2, 2006, 35 pgs. http://tools.ietf.org/html/draft-kobayashi-ipfix-concentrator-mib-01txt.

Norseth et al., "IPFIX Architecture Architecture for IP Flow Information Export," Network Working Group RFC 5470, Feb. 2002, 25 pages http://tools.ietf.org/pdf/draft-ietf-ipfix-architecture-00.pdf.

PCT Notification of Transmittal (1 page) of the International Search Report (4 pages) and the Written Opinion of the International Search Authority (6 pages) mailed Aug. 18, 2010 for PCT/US2010/030607.

Sadasivan et al., "Architecture for IP Flow Information Export," IP Flow Information Export WG (ipfix), Jun. 2004, 34 pgs. http://tools.ietf.org/pdf/draft-ietf-ipfix-architecture-03.pdf.

Zseby et al., "IPFIX Applicability," Network Working Group RFC 5472, Jul. 2004, 15 pages; http://tools.ietf.org/htmldraft-ietf-ipfix-as-02.pdf.

PCT Sep. 6, 2011 International Preliminary Report on Patentability and Written Opinion from PCT/US2010/030607; 7 pages.

Claise, B., et al., "Export of Structured Data in IPFIX," IPFIX Working Group, Internet-Draft, 33 pages http://tools.ietf.org/id/draft-claise-structured-data-in-ipfix-00.txt, Mar. 3, 2009.

Kompella, R.R. and Estan, C., "The Power of Slicing in Internet Flow Measurement," USENIX Association, Internet Measurement Conference 2005, http://www.usenix.org/events/imc05/tech/kompella.html; 14 pages.

Cisco Systems, "NetFlow Services Solutions Guide," http://www.cisco.com/en/US/products/sw/netmgtsw/ps1964/products_implementation_design_guide09186a00800d6a11.html#wp1031447; 71 pages, Jan. 22, 2007.

Burbank, J., et al., "Network Time Protocol Version 4 Protocol and Algorithms Specification," draft-ietf-ntp-ntpv4-proto-13; http://tools.ietf.org/html/draft-ietf-ntp-ntpv4-proto-13; 113 pages, Oct. 9, 2009.

Franklin, Paul F., "LXI Makes Smart Instruments Possible," Apr. 2007; www.lxiconnexion.com; 4 pages.

* cited by examiner

| 0 | Field ID | Element Length |
|---|---|---|
| | BasicList Content... | |
| | ... | |

| 1 | Field ID | Element Length |
|---|---|---|
| | Enterprise Number | |
| | BasicList Content... | |
| | ... | |

| Length (< 255) | basicList Information Element |
|---|---|
| ... continuing as needed | |

| 255 | Length (0 to 65535) | ... |
|---|---|---|
| basicList Information Element | | |

FIG. 5   50

```
 0  1  2  3  4  5  6  7  8  9 10 11 12 13 14 15 16 17 18 19 20 21 22 23 24 25 26 27 28 29 30 31
```
| Template ID | SubTemplateList Content |
|---|---|
| ... ||

FIG. 6   60

```
 0  1  2  3  4  5  6  7  8  9 10 11 12 13 14 15 16 17 18 19 20 21 22 23 24 25 26 27 28 29 30 31
```
| Length (< 255) | subTemplateList Information Element |
|---|---|
| ... continuing as needed ||

FIG. 7   70

```
 0  1  2  3  4  5  6  7  8  9 10 11 12 13 14 15 16 17 18 19 20 21 22 23 24 25 26 27 28 29 30 31
```
| 255 | Length (0 to 65535) | IE |
|---|---|---|
| basicList Information Element |||

FIG. 8   80

```
 0  1  2  3  4  5  6  7  8  9 10 11 12 13 14 15 16 17 18 19 20 21 22 23 24 25 26 27 28 29 30 31
```
| Element 1 Length | Element 1 Template ID |
|---|---|
| Element 1 Content ... ||
| Element 2 Length | Element 2 Template ID |
| Element 2 Content ... ||
| ... ||
| Element N Length | Element N Template ID |
| Element N Content ... ||

| Length (< 255) | subTemplateMultiList Information Element |
|---|---|
| ...continuing as needed ||

| 255 | Length (0 to 65535) | IE |
|---|---|---|
| subTemplateList Information Element |||

| | Set ID = 2 | Length = 20 octets |
|---|---|---|
| | Template ID = 258 | Field Count = 3 |
| 0 | userID = N/A | Field Length = 4 |
| 0 | sourceIPv4Address = 8 | Field Length = 4 |
| 0 | basicList = XXX | Field Length = 0xFFFF |

FIG. 12  120

| userId = 1 | ||
|---|---|---|
| sourceIPv4Address = 192.0.2.201 | ||
| 255 | applicationId List Length = 16 | appId Field... |
| ... ID = 95 | appId Field Length = 4 | ... |
| applicationId = 1001 || ... |
| applicationId = 1002 || ... |
| applicationId = 1003 ||  |

FIG. 13  130

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 16 octets |
| Template ID = 258 | Field Count = 2 |
| 0 destinationIPv4Address = 12 | Field Length = 4 |
| 0 basicList = XXX | Field Length = 0xFFFF |

FIG. 14 ↘140

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 16 octets |
| Template ID = 259 | Field Count = 2 |
| 0 sourceIPv4Address = 8 | Field Length = 4 |
| 0 applicationId = 95 | Field Length = 4 |

FIG. 15 ↘150

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 16 octets |
| Template ID = 260 | Field Count = 2 |
| 0 subTemplateList = YYY | Field Length = 0xFFFF |
| 0 subTemplateList = YYY | Field Length = 0xFFFF |

FIG. 16 ↘160

| 0 1 2 3 4 5 6 7 8 9 10 11 12 13 14 15 | 16 17 18 19 20 21 22 23 24 25 26 27 28 29 30 31 | |
|---|---|---|
| Set ID = 2 || Length = 24 octets |
| Template ID = 261 || Field Count = 4 |
| 0 | signatureID = N/A | Field Length = 2 |
| 0 | protocolIdentifier = 4 | Field Length = 1 |
| 0 | riskRating = N/A | Field Length = 1 |
| 0 | subTemplateList = YYY | Field Length = 0xFFFF |

FIG. 17   170

| 0 1 2 3 4 5 6 7 8 9 10 11 12 13 14 15 | 16 17 18 19 20 21 22 23 | 24 25 26 27 28 29 30 31 |
|---|---|---|
| Set ID = 261 || Length = 66 |
| signatureId = 1003 | protocolId = 17 | riskRating = 10 |
| 255 | participant Length = 55 | participant ... |
| Template ID = 260 | 255 | attacker Length = 26 |
| attacker Template ID = 259 || attacker1 sourceIPvAddress = |
| 192.0.2.3 || attacker1 applicationId = |
| 103 || attacker2 sourceIPvAddress = |
| 192.0.2.4 || attacker2 applicationId = |
| 104 || attacker3 sourceIPvAddress = |
| 192.0.2.5 || attacker3 applicationId = |
| 105 | 255 | target ... |
| Length = 21 | target Template ID = 258 | target ... |
| destinationIPv4Address = 192.0.2.104 || 255 |
| target appId List Length = 16 || target appId Field Id = 95 |
| target appID Field Length = 4 || target appId = 4001 |
| 3-4 octets of appId 4001 || target appId = 4002 |
| 3-4 octets of appId 4002 |||

FIG. 18   180

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 16 octets |
| Template ID = 258 | Field Count = 2 |
| 0 destinationIPv4Address = 12 | Field Length = 4 |
| 0 basicList = XXX | Field Length = 0xFFFF |

190

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 16 octets |
| Template ID = 259 | Field Count = 2 |
| 0 sourceIPv4Address = 8 | Field Length = 4 |
| 0 applicationId = 95 | Field Length = 4 |

200

| 0 1 2 3 4 5 6 7 8 9 10 11 12 13 14 15 | 16 17 18 19 20 21 22 23 24 25 26 27 28 29 30 31 |
|---|---|
| Set ID = 2 | Length = 12 octets |
| Template ID = 260 | Field Count = 1 |
| 0 subTemplateMultiList = ZZZ | Field Length = 0xFFFF |

210

| 0 1 2 3 4 5 6 7 8 9 10 11 12 13 14 15 | 16 17 18 19 20 21 22 23 24 25 26 27 28 29 30 31 | |
|---|---|---|
| Set ID = 2 | Length = 24 octets | |
| Template ID = 261 | Field Count = 4 | |
| 0 | signatureId = N/A | Field Length = 2 |
| 0 | protocolIdentifier = 4 | Field Length = 1 |
| 0 | riskRating = N/A | Field Length = 1 |
| 0 | subTemplateList = YYY | Field Length = 0xFFFF |

FIG. 22    220

| 0 1 2 3 4 5 6 7 8 9 10 11 12 13 14 15 | 16 17 18 19 20 21 22 23 | 24 25 26 27 28 29 30 31 |
|---|---|---|
| Set ID = 261 | Length = 66 | |
| signatureId = 1003 | protocolId = 17 | riskRating = 10 |
| 255 | participant Length = 55 | participant |
| Template ID = 260 | 255 | subTemplateMultiList Length=50 |
| 255 | attacker1 Length = 10 | attacker1 |
| Template ID = 259 | attacker1 sourceIPvAddress = | |
| 192.0.2.3 | attacker1 applicationId = | |
| 103 | 255 | target1 Length = 21 |
| target 1 Template ID = 258 | target1 destinationIPvAddress= | |
| 192.0.2.103 | 255 | target appId |
| List Length = 12 | target1 appId Field Id = 95 | target appId |
| Field ID Len = 4 | target1 applicationId = | |
| 3001 | target1 applicationId = | |
| 3002 | attacker2 Length = 10 | |
| attacker2 Template ID = 259 | attacker2 srcIPv4Address = | |
| 192.0.2.4 | attacker2 applicationId = | |
| 104 | | |

FIG. 23    230

SYSTEM AND METHOD FOR EXPORTING STRUCTURED DATA IN A NETWORK ENVIRONMENT

CLAIMING PRIORITY TO A PROVISIONAL

This Application claims priority under 35 U.S.C. §119 of provisional application Ser. No. 61/157,336, filed Mar. 4, 2009 and entitled: EXPORT OF STRUCTURED DATA, which is hereby incorporated herein by reference in its entirety.

TECHNICAL FIELD

This disclosure relates in general to the field of communications and, more particularly, to exporting structured data in a network environment.

BACKGROUND

Networking architectures have grown increasingly complex in communications environments. In addition, the augmentation of clients or end users wishing to communicate in a network environment has caused many networking configurations and systems to respond by adding elements to accommodate the increase in networking traffic. The increase in network traffic and in end users has created even more data to be routed, managed, and analyzed. In some cases, data records containing information about traffic can be exported from one point to another. These records can be used for a variety of purposes. As data has grown in complexity and sophistication, there is a significant challenge in optimally exporting this information.

BRIEF DESCRIPTION OF THE DRAWINGS

To provide a more complete understanding of example embodiments and features and advantages thereof, reference is made to the following description, taken in conjunction with the accompanying figures, wherein like reference numerals represent like parts, in which:

FIG. 2 illustrates an example schematic diagram of an embodiment of a basicList information element encoding;

FIG. 3 illustrates an example schematic diagram of an embodiment of a basicList encoding with enterprise number;

FIG. 4 illustrates an example schematic diagram of an embodiment of a variable-length basicList information element encoding (Length<255 octets);

FIG. 5 illustrates an example schematic diagram of an embodiment of a variable-length basicList information element encoding of a length 0-65535 octets;

FIG. 6 illustrates an example schematic diagram of an embodiment of a subTemplateList encoding;

FIG. 7 illustrates an example schematic diagram of an embodiment of a variable-length subTemplateList information element having a length<255 octets;

FIG. 8 illustrates an example schematic diagram of an embodiment of a variable-length subTemplateList information element encoding having a length of 0-65535 octets;

FIG. 9 illustrates an example schematic diagram of an embodiment of a subTemplateMultiList encoding;

FIG. 10 illustrates an example schematic diagram of an embodiment of a variable-length subTemplateMultiList information element;

FIG. 11 illustrates an example schematic diagram of an embodiment of a variable-length subTemplateMultiList information element;

FIG. 12 illustrates an example schematic diagram of an embodiment of an encoding basicList template record;

FIG. 13 illustrates an example schematic diagram of an embodiment of an encoding basicList data record;

FIG. 14 illustrates an example schematic diagram of an embodiment of an encoding subTemplateList template for a Target;

FIG. 15 illustrates an example schematic diagram of an embodiment of an encoding subTemplateList template for an Attacker;

FIG. 16 illustrates an example schematic diagram of an embodiment of an encoding subTemplateList template for a Participant;

FIG. 17 illustrates an example schematic diagram of an embodiment of an encoding subTemplateList template for an alert;

FIG. 18 illustrates an example schematic diagram of an embodiment of an encoding subTemplateList data set;

FIG. 22 illustrates an example schematic diagram of an embodiment of a encoding subTemplateMultiList template for an alert; and FIG. 23 illustrates an example schematic diagram of an embodiment of an encoding subTemplateMultiList data set.

DETAILED DESCRIPTION OF EXAMPLE EMBODIMENTS

Overview

An apparatus is provided in one example embodiment and includes a network element configured to receive a plurality of packets. The network element is configured to couple to a module, the module being configured to generate a data record that is based on information associated with the packets. The data record is interpreted according to a template in which multiple information elements can be positioned to create a hierarchical relationship within the structured data. The structured data further includes references to the information elements. The network element further including an export module configured to export the data record to a network management station.

Figure 1:
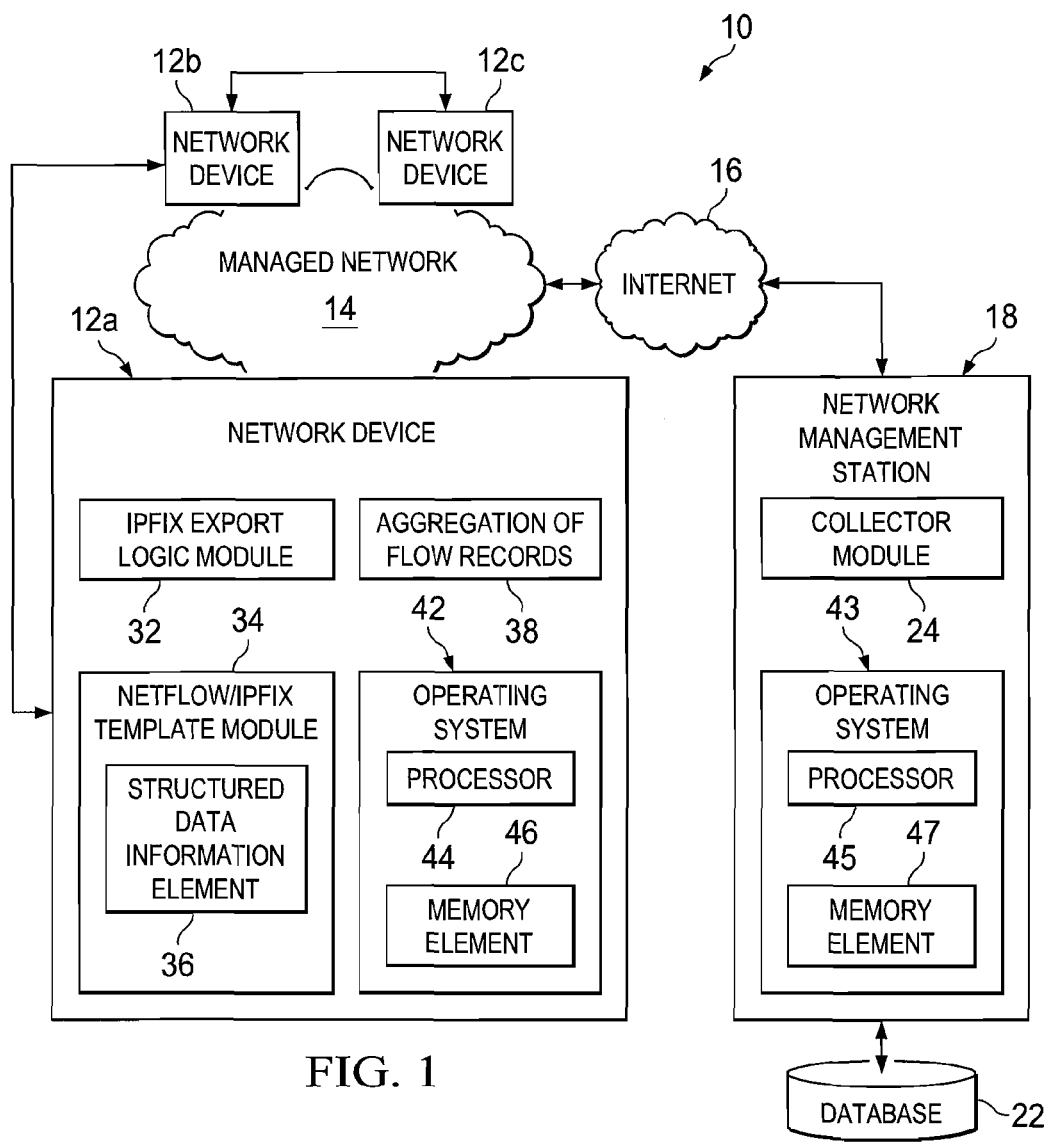
FIG. 1 is a simplified communication system for exporting structured and repeated data in accordance with one example embodiment.

Turning to FIG. 1, FIG. 1 is a simplified communication system 10 for exporting structured and repeated data in accordance with one example embodiment. Communication system 10 may include a set of network devices 12a-c, a managed network 14, an Internet 16, a network management station 18, which may include a collector module 24, and network management station 18 may be coupled to a database 22. Each network device 12a-c may include an IP flow Information eXport (IPFIX) logic module 32, a NetFlow/IPFIX template module 34 (which may include a structured data information element 36 that could also be present in the data records), an aggregation of flow records element 38, and an operating system 42, which may include a processor 44 and a memory element 46. In a similar manner, network management station 18 may include an operating system 43, a processor 45, and a memory element 47.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. FIG. 1 includes multiple network devices 12a-c being coupled to managed network 14. Note that the numerical and letter designations assigned to the network devices do not connote any type of hierarchy; the designations are arbitrary and have been used for purposes of teaching only. These designations should not be construed in any way to limit their capabilities, functionalities, or applications in the potential environments that may benefit from the features of communication system 10. Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol or tunneling technique, where appropriate and based on particular needs.

In example embodiments, an approach is defined in communication system 10 that specifies an extension to the IPFIX protocol specification provided in RFC5101 and the IPFIX information model specified in RFC5102 to support hierarchical structured data and lists (sequences) of information elements in data records. This extension enables a defining of complex data structures such as variable-length lists and, further, specifications for hierarchical containment relationships between templates. IPFIX offers a protocol based on NetFlow (as defined in RFC3954). An IPFIX (or NetFlow) exporting process can export data records. Although IPFIX was originally developed for exporting flow information, it can be used for exporting any kind of data. A data record can consist of one or more attributes, each of which corresponds to an information element. The IPFIX information model offers the base set of information elements for IPFIX. For each information element, the information model defines a numeric identifier, an abstract data type, an encoding mechanism for the data type, and any semantic constraints. Only basic, single-valued data types (e.g., numbers, strings, and network addresses) are currently supported.

It is currently not possible to encode hierarchical structured data and lists (sequences) of such data as fields within IPFIX and NetFlow records. As it is currently defined, a data record in IPFIX is a "flat" list of single-valued attributes. NetFlow and IPFIX have customarily exported "flat" data records. This mechanism has been appropriate for the requirements thus far. However, a new series of network management applications can request the export of structured data records in NetFlow and IPFIX. One example is the export of repeated and/or variable data from a router, or a firewall device (i.e., a network security element of some kind). Communication system 10 can readily accommodate this request, as detailed herein.

Example embodiments presented offer an enhanced data-modeling proposition to compose complex hierarchies of data types. More specifically, an extension to IPFIX and to NetFlow is offered to support hierarchical structured data and variable-length lists (sequences) of information elements in data. In example embodiments, the system can define templates to represent the structured hierarchical relationship. The template mechanism for representing the "flat" data is defined in RFCs 5101/5102, where part of the innovation presented is in applying this existing template mechanism to represent structured data.

In one example, hierarchical data structures can be defined having an arbitrary depth. This can be exported from a network device (e.g., via IPFIX export logic module 32) to a receiving end (e.g., network management station 18), which can interpret the data records according to templates and subsequently provide various reports, statistical analysis, diagnostic evaluations, etc. Templates can be sent ahead of data records and these templates could possibly have structured data as information elements. Data records that contain structured data are sent later and these data records can be interpreted according to the templates. The extensions provide a packaging mechanism for the data that is being collected by the network device. Note that as used herein in this Specification, the term 'export' is meant to encompass any type of transmitting activity from one node to another in the context of the data communications outlined herein.

Turning to the operational capabilities of the elements of FIG. 1, network device 12a can be any type of network element that receives packets. It is consistently establishing flows and generating records associated with the data passing through it. Network device 12a can collect information related to these packets (e.g., via aggregation of flow records element 38) and subsequently encode the data in the format explained herein. Note that the aggregation can be spatial aggregation (i.e. the aggregation of data records observed from multiple observation points), or time composition (i.e. the aggregation of data records observed from different points in time). This information can be aggregated and sent to network management station 18, which can receive it and process this information. This could involve IPFIX export logic module 32, NetFlow/IPFIX template module 34, and structured data information element 36: all of which can assist in these operations.

Network management station 18 can take this information and develop statistics or create reports that highlight significant issues associated with the data propagating through the network device. Essentially, the raw data can be used for virtually any type of reporting application, performance analysis, troubleshooting activities, etc. occurring in the network. The raw data can be any content that is relevant to activities associated with the particular network device, or the data can relate to other components in the network for which the transmitting network device has developed some knowledge.

In one example implementation, network device 12a and network management station 18 include elements (e.g., software) that facilitate the extensions outlined herein. Network device 12a can include the ability to construct hierarchical data and export this information (e.g., via templates), where data could be received and processed by elements residing within network management station 18. In this sense, these two devices offer symmetrical, complementary operations in which data being transmitted by network device 12a can be understood and processed effectively by network management station 18 (for example, through collector module 24).

The extensions discussed herein could have particular value in activities associated with telemetry, which allows for the remote measurement and reporting of information to a system designer or to a network operator. Other applications could involve routing packets, intrusion detection and security, load balancing, deep packet inspection, network address translation (NAT-ing), label switching (e.g., in the context of MPLS activities), and any other scenario in which such metrics would be valuable.

It should be noted that a given network device can use any one or more of the information elements defined herein. Any of these structured data elements can be leveraged in order to optimally deliver information to network management station 18, or to any other destination that would seek to obtain this information. The new data types being introduced herein are general-purpose in that they can be used in various ways. The transport mechanism being offered can be employed by a given network device in any manner that suits its particular reporting needs.

There are numerous advantages provided by such activities. For example, such operations offer a compact way to export information. In contrast, if someone were to desire to export such information about metrics for specific flows, for example in a simple one-minute interval, sixty flow records would have to be created and exported. If this were to occur, a substantial portion of the bandwidth available between network device 12a and network management station 18 would be consumed. In contrast, the concepts presented herein can offer an effective aggregation of these metrics into a single flow record for discrete transmissions. Not only is a protocol being extended to optimize transmissions associated with flow records, hierarchical information elements are delivering more sophisticated and more comprehensive information in a single transmission.

Consider an example involving a router scenario that routinely occurs in the network. Typically, a request is made to a router to collect some performance metrics related to flow records. In example embodiments, IPFIX can be used for this purpose, as it can classify packets into flow records based on certain fields. Aside from this, performance metrics could be collected on a systematic basis. For example, metrics could be collected for the 'packet size mean' over a designated time interval. Another example could involve packet delay, or virtually any other parameter for which statistical data is sought. This information can be collected, and the decision can be made as to how to report this information. For example, every one minute, a single data record can be sent and that data record could include information about the packets, along with the list of metrics. This can be readily exported, for example to network management station 18, where the structured data would be interpreted at network management station 18.

For example and with respect to a 5-tuple model, the following items could be provided in the data: source and destination IP addresses, protocol, source and destination port numbers, packet and byte counters the transport, and a list of information elements. The first segment of this flow could be time stamped and the second segment could refer to the metrics. The NetFlow IPFIX protocol could be used in its conventional manner such that a template could be exported to network management station 18 (or more specifically to collector module 24), which would know how to decode information (specifically decipher the flow records) based on the templates discussed herein. In one example implementation, collector module 24 resides within network management station 18, but alternatively could be positioned or located elsewhere in the network.

Another example implementation of communication system 10 relates to security. An IPS (Intrusion Prevention System) alert data structure could contain multiple participants. Each participant can contain multiple attackers and multiple targets, with each target potentially composed of multiple applications. An intrusion prevention system alert (IPSAlert) data structure could be composed of: Participant, Attacker, Target, and AppID. Each Participant can have multiple Attackers, multiple Targets, and multiple AppIDs. Another example relates to the mediation function. A top level Collection Process can request the video data records from the Collection Processes in the network. Each collector module or collector element (or any other type of export module) could export a structure composed of: Router, Line Card, and video-related data records. Each router can have multiple line cards, which in turn can have multiple video-related data records.

Example embodiments presented herein offer an IPFIX extension to support hierarchical structured data and variable-length lists by defining three new information elements and three corresponding new abstract data types, which are called basicList, subTemplateList, and subTemplateMultiList. The basic list represents a list of zero or more instances of any single information element, which can be primarily used for single-valued data types (for example, a list of port numbers, list of interface indexes, etc.). The sub-template list represents a list of zero or more instances of structured data, where the data type of each list element is the same and corresponds with a single template record (for example, structured data composed of multiple pairs of IP addresses). The sub-template multi-list represents a list of zero or more instances of structured data, where the data type of each list element can be different and corresponds with different template definitions (for example, a structured data composed of multiple access-list entries, where entries can be composed of different criteria types). These informational elements can be varied considerably, or modified for specific scenarios without departing from the broad scope of the concepts presented herein. These informational elements are further detailed below with reference to specific FIGURES.

Returning to the infrastructure of FIG. 1, for purposes of simplification, a brief overview of network device 12a is provided, but these internal elements of 12a can be replicated in the other network devices. As used herein in this Specification, network device 12a and network management station 18 are 'network elements' that can exchange data in a network environment. Both network management station 18 and network device 12a can initiate or facilitate any type of data exchange within communication system 10. Data, as used herein in this document, refers to any information element types: video, numeric, audio, or script data, or any type of source or object code, or any other suitable information in any appropriate format that may be communicated from one point to another. Accordingly, network device 12a and network management station 18 can be any network element, a proprietary device, switches, servers, routers, gateways, firewalls, bridges, loadbalancers, or any other suitable device, network appliance, component, element, or object operable to exchange or to process information in a network environment. Moreover, network device 12a and network management station 18 may include any suitable hardware, software, components, modules, interfaces, or objects that facilitate the operations thereof. This may be inclusive of appropriate algorithms and communication protocols that allow for the effective delivery and coordination of data or information.

Network device 12a and network management station 18 can be equipped with appropriate software to execute the described extension operations in an example embodiment of the present disclosure. Memory elements (e.g., memory element 46, 47) and processors (which facilitate these outlined operations) may be included in these devices or be provided externally to these devices, or consolidated in any suitable fashion. The processors (e.g., processor 44, 45) can readily execute code (software) for effectuating the activities described.

The memory elements identified above can store information to be referenced by network device 12a and network management station 18. As used herein in this document, the term 'memory element' is inclusive of any suitable database (e.g., database 22) or storage medium (provided in any appropriate format) that is capable of maintaining information pertinent to the coordination and/or processing operations of network device 12a and network management station 18. For example, the memory elements may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

As identified earlier, in one example implementation, network device 12a and network management station 18 include software to achieve the extension operations, as outlined herein in this document. This may include software (e.g., reciprocating software or software that assists in the transmitting/receiving signals, processing signals, requesting signals, etc.) to help coordinate the extension activities explained herein. In other embodiments, this processing and/or coordination feature may be provided external to these devices or included in some other device to achieve this intended functionality.

Turning to more specific details relating to the templates and structured data information elements, FIGS. 2-23 illustrate example embodiments of some of the activities associated with communication system 10. For purposes of teaching and further understanding some of the operational capabilities of the tendered architecture, a brief overview of IPFIX is offered. The IPFIX Protocol provides network administrators with access to IP flow information. The architecture for the export of measured IP flow information (out of an IPFIX Exporting Process to a Collecting Process) is defined in the IPFIX Architecture, per the requirements defined in RFC 3917. The IPFIX Architecture [of RFC5470] specifies how IPFIX data records and templates are carried via a congestion-aware transport protocol from IPFIX Exporting Processes to IPFIX Collecting Processes. IPFIX has a formal description of IPFIX information elements, their name, type, and additional semantic information, as specified in the IPFIX information model.

In regards to the relationship between IPFIX and the Packet Sampling Protocol (PSAMP), the PSAMP protocol [of RFC5476] specifies the export of packet information from a PSAMP Exporting Process to a PSAMP Collecting Process. Like IPFIX, PSAMP has a formal description of its information elements, their name, type, and additional semantic information. The PSAMP information model is defined in [RFC5477]. As the PSAMP protocol specifications are based on the IPFIX protocol specifications, the specifications in this document are also valid for the PSAMP protocol. One difference between IPFIX and PSAMP is that the IPFIX protocol exports flow records, while the PSAMP protocol exports packet reports. From a pure export point of view, IPFIX does not distinguish a flow record composed of several packets aggregated together, from a flow record composed of a single packet. Therefore, the PSAMP export can be seen as special IPFIX flow record containing information about a single packet. In terms of the terminology being used herein, a structured data information element is one of the information elements supporting structured data (i.e., the basicList, subTemplateList, or subTemplateMultiList).

Example embodiments presented herein have specified a protocol to export structured data (some of which may be related to IP flow information). The IPFIX protocol is designed to export information about IP traffic flows and related measurement data, where a flow can be defined by a set of key attributes (e.g. source and destination IP address, source and destination port, etc.). The IPFIX protocol specifies that IP traffic measurements for flows are exported using a TLV (type, length, value) format. The information is exported using a template record that is sent once to export the {type, length} pairs that define the data format for the information elements in a flow. The data records specify values for each flow.

Based on the guidelines for IPFIX, the IPFIX protocol has been optimized to export flow related information. However, due to its template mechanism, the IPFIX protocol can export any type of information, as long as the relevant information element is specified in the IPFIX information model, or is registered with the Internet Assigned Numbers Authority (IANA), or is specified as an enterprise-specific information element, etc. In example embodiments, for each information element, the IPFIX information model defines a numeric identifier, an abstract data type, an encoding mechanism for the data type, and any semantic constraints.

In regards to Abstract Data Types, it is important to note that, whereas the information elements and abstract data types defined in the IPFIX information model represent single values, the new abstract data types described herein are structural in nature and primarily contain references to other information elements and to templates. By referencing other information elements and templates from an information element's data content, it is possible to define complex data structures such as variable-length lists and to specify hierarchical containment relationships between templates. Throughout the following explanations, a more generic term 'data record' (that could include any piece of data) is used, as opposed to a more specific term "flow record."

IPFIX has several current limitations. Consider the example scenario of an IPS alert data structure containing multiple participants, where each participant contains multiple attackers and multiple targets with each target potentially composed of multiple applications, as depicted below:

```
alert
   signatureId
   protocolIdentifier
   riskRating
   participant 1
   attacker 1
      sourceIPv4Address
      applicationId
   ...
   attacker N
      sourceIPv4Address
      applicationId
   target 1
      destinationIPv4Address
      applicationId 1
      ...
      applicationId n
   ...
   target N
      destinationIPv4Address
      applicationId 1
      ...
      applicationId n
   participant 2
   ...
```

To export this information in IPFIX, the data would need to be flattened (thus losing the hierarchical relationships) and a new IPFIX template created for each alert, according to the number of applicationId elements in each target, the number of targets and attackers in each participant and the number of participants in each alert. Each template would be unique to each alert, and a large amount of CPU, memory, and export bandwidth is wasted in creating, exporting, maintaining, and withdrawing the templates.

To address these inefficiencies (and others), outlined herein are three new abstract data types in accordance with one example implementation. In terms of a linkage with the information model, as in the IPFIX Protocol specification, the new information elements can be sent in canonical format in network-byte order (also known as the big-endian byte ordering).

The following explanations help define the encoding of the data types identified above. When the encoding of a structured data information element has a fixed length (because, for example, it contains the same number of fixed-length elements, or if the permutations of elements in the list produces the same total length), the element length can be encoded in the corresponding template record. However, when representing variable-length data, hierarchical data, and repeated data with variable element counts, these can be encoded as a variable-length information element with the length carried in one or three octets before the structured data information element encoding.

The basicList information element represents a list of zero or more instances of an information element in accordance with one example configuration. FIG. 2 illustrates an encoding example 20, showing how the basicList information element could be encoded. The Field ID is the information element identifier of the information element(s) contained in the list. The Element Length indicates the length of each element or contains the value 0xFFFF if the length is encoded as an IPFIX variable-length information element. A Collection Process decodes list elements from the BasicList Content until no further data remains. A record count is not included but can be derived when the information element is decoded. The Field ID can be shown with the Enterprise bit (most significant bit) set to 0. If instead the Enterprise bit is set to 1, a four-byte enterprise number can be encoded immediately after the Element Length as is depicted by an encoding example 30 illustrated by FIG. 3. FIG. 3 depicts an example of a basicList encoding with enterprise number. FIG. 4 depicts an example basicList information element encoding 40 (Length<255 octets).

Also note that if a basicList has zero elements, the encoded data contains the Field ID, the Element Length, and the four-byte enterprise number (if present). The BasicList Content is empty. The Element Length field is effectively part of a header, so even in the case of a zero-element list with no enterprise number, it is not omitted. FIG. 5 depicts an example variable-Length basicList information element encoding 50 (Length 0 to 65535 octets). FIG. 6 shows how a subTemplateList information element 60 can be encoded within a data record in accordance with one example. FIG. 7 illustrates an example subTemplateList information element encoding 70 (Length<255 octets).

The template ID is the ID of the template used to encode and decode the SubTemplateList Content. The SubTemplateList Content consists of zero or more instances of data records corresponding to the template ID. A Collecting Process decodes the data records until no further data remains. A record count is not included but can be derived when the subTemplateList is decoded. Encoding and decoding are performed recursively if the specified template itself contains structured data information elements as described herein. Note that, if a subTemplateList has zero elements, the encoded data contains just the template ID; the SubTemplateList Content is empty.

FIG. 8 depicts an example of a variable-length subTemplateList information element encoding 80 (Length 0 to 65535 octets). Whereas each top-level element in a subTemplateList information element corresponds with a single template ID and, therefore, has the same data type, sometimes it is useful for a list to contain elements of more than one data type. To support this case, each top-level element in a subTemplateMultiList information element carries a template ID and Length. FIG. 9 shows how a subTemplateMultiList information element is encoded within an IPFIX data record. FIG. 9 depicts an example of a subTemplateMultiList encoding Element Length 90. For the element template ID, unlike the subTemplateList information element, each list element contains an Element Length and element template ID, which specifies the encoding of the following Element Content. The Element Content consists of zero or more instances of data records corresponding to the element template ID. A Collecting Process decodes the data records until no further data remains. A record count is not included but can be derived when the Element Content is decoded. Encoding and decoding are performed recursively if the specified template itself contains structured data information elements.

FIG. 10 depicts an example variable-length subTemplateMultiList information element encoding 100 (Length<255 octets). FIG. 11 depicts an example of a variable-length subTemplateMultiList information element encoding 110 (Length 0 to 65535 octets).

In terms of the structured data format, the new structured data information elements can represent a list that potentially carries complex hierarchical and repeated data in accordance with one example implementation. In the normal case where the number and length of elements can vary from record to record, these information elements can be encoded as variable-length information elements.

For the Collecting Process's Side, a Collecting Process can note the information element identifier of any information element that it does not understand and may discard that information element from the flow record. Therefore, a Collection Process that does not support the extension specified herein can ignore the structured data information elements in a data record, or it can ignore data records containing these new structured data information elements while continuing to process other data records.

For structured data encoding examples, the following scenarios are created solely for illustrating how the extensions proposed herein could be encoded. For encoding a BasicList, a user_record containing the following data can be encoded as follows.

| userId | sourceIPv4Address | applicationId list |
| --- | --- | --- |
| 1 | 192.0.2.201 | 1001, 1002, 1003 |

The userId is used to uniquely identify the user. The user_record contains the data for a user from a particular IP address accessing a set of applications, where the number of applications could be variable. The template record for the user_record, with the template ID 258, is shown in FIG. 12. FIG. 12 depicts an encoding of a template record containing a basicList 120. The list of applications is represented as a basicList; the Length of the list is chosen to be encoded in three bytes even though it may be less than 255 octets. The data set can be represented as shown in FIG. 13. FIG. 13 depicts an example encoding of a data record containing a basicList 130. The 'N/A' in FIG. 12 is used to identify that this space is not applicable because there is no such information element currently in IANA. This notation would similarly apply to FIGS. 17 and 22. Note also that the values XXX, YYY, and ZZZ throughout the examples represent information elements to be assigned by IANA in the future.

Another example consists of an IPS alert consists of the following mandatory attributes: signatureId, protocolIdentifier, and riskRating. It can also contain zero or more participants, and each participant can contain zero or more attackers and zero or more targets. An attacker can contain the attributes sourceIPv4Address and applicationId and a target contains the attribute destinationIPv4Address and zero or more occurrences of the attribute applicationId. Note that the signatureId and riskRating information element fields are created for these examples only, the Field IDs are shown as N/A. The signatureId helps to uniquely identify the IPS signature that triggered the alert. The riskRating identifies the potential risk, on a scale of 0-100 (100 being most serious), of the traffic that triggered the alert.

To represent an alert, the following templates can be defined:

Template for target (258)
Template for attacker (259)
Template for participant (260)
Template for alert (261)
   alert (261)
     |(signatureId)
     |(protocolIdentifier)
     |(riskRating)
     |
     +------- list of participants (260)
           |
           +------- attacker (259)
           |      (sourceIPv4Address)
           |      (applicationId)
           |
           +------- target (258)
           |(destinationIPv4Address)
           |(list of applicationId)

The template Record for the target, with the template ID 258, is illustrated by FIG. 14. FIG. 14 offers an example of a template 140 containing a basicList. The list of applicationId in the target is represented as a basicList. The template Record 150 for the attacker (259) is shown in FIG. 15. The template record for a participant with the template ID 260 is shown by FIG. 16. FIG. 16 illustrates an example encoding subTemplateList template 160 for a Participant. The first subTemplateList in the participant contains a list of attackers; the second subTemplateList contains a list of targets. An example template record 170 for an alert is shown in FIG. 17, with the template ID 261. This represents an encoding of a template containing a subTemplateList for an IPS Alert. The subTemplateList in the alert template Record contains a list of participants.

Consider an IPS alert with one participant, where the participant contains multiple attackers and one target with multiple applications.

|  |  |  | Participant | | | |
|---|---|---|---|---|---|---|
|  | protocol |  | attacker | | target | |
| sigId | Id | risk Rating | ip | appId | ip | appId(s) |
| 1003 | 17 | 10 | 192.0.2.3 | 103 | 192.0.2.104 | 4001, 4002 |
|  |  |  | 192.0.2.4 | 104 |  |  |
|  |  |  | 192.0.2.5 | 105 |  |  |

The data record is represented in FIG. 18, where the Length of the basicList and subTemplateList information elements are encoded in three bytes even though they may be less than 255 octets. FIG. 18 illustrates an example encoding of a data set containing a subTemplateList 180.

For encoding a subTemplateMultiList, consider the following contrived example of an IPS alert. The participant can contain attackers and targets in any order and the sequence conveys some information to the Collector and needs to be preserved. In the example below, there are two attackers A1 and A2, and one target, T1. This information is encoded as a subTemplateMultiList.

|  |  |  | Participant | | | |
|---|---|---|---|---|---|---|
|  | protocol |  | attacker | | target | |
| sigId | Id | risk Rating | ip | appId | ip | appId(s) |
| 1003 | 17 | 10 | 192.0.2.3 | 103 | 192.0.2.103 | 3001, 3002 |
|  |  |  | 192.0.2.4 | 104 |  |  |

Where attacker A1 is: 192.0.2.3 103
Where attacker A2 is: 192.0.2.4 104
Where target T1 is: 192.0.2.103 3001, 3002

To represent an alert, the following templates are defined:
Template for target (258)
Template for attacker (259)
Template for participant (260)
Template for alert (261).

Figure 19:
FIG. 19 illustrates an example schematic diagram of an embodiment of an encoding subTemplateMultiList template for a Target.
Figure 20:
FIG. 20 illustrates an example schematic diagram of an embodiment of an encoding subTemplateMultiList template for an Attacker.
Figure 21:
FIG. 21 illustrates an example schematic diagram of an embodiment of an encoding subTemplateMultiList template for a Participant.

The template Record for a target, with the template ID 258, is shown in FIG. 19. FIG. 19 illustrates an encoding subTemplateMultiList template 190 for Target. The list of applicationId in the target template Record is represented as a basicList. The template Record for the attacker, with the template ID 259, is shown in FIG. 20. FIG. 20 depicts an example encoding subTemplateMultiList template 200 for the attacker. An example of a template record 210 for a participant, using template ID 260, is shown in FIG. 21. The template record for the participant has one subTemplateMultiList information element, which is a list that can include attackers and targets repeated in any order. An example template Record 220 for an IPS alert, using template ID 261, is shown in FIG. 22. The subTemplateList in the alert template record contains a list of participants.

The Length of basicList, subTemplateList, and subTemplateMultiList can be encoded in three bytes even though it may be less than 255 octets. The data set can be represented as shown in FIG. 23, which is an example of encoding a subTemplateMultiList data set 230. In regards to the Relationship with Reducing Redundancy (e.g., RFC5473), there are bandwidth saving methods for exporting flow or packet information using the IPFIX protocol. For example, RFC5473 defines the commonPropertiesID information element for exporting Common Properties. The new structured data types listed above may be used to define a list of commonPropertiesID. When structured data contains repeated elements, these elements may be replaced with a commonPropertiesID information element as described in RFC5473. The replaced elements may include the basicList, subTemplateList, and subTemplateMultiList information elements.

Note that with the examples provided herein, interaction may be described in terms of two, three, four, or more network elements or associated modules, etc. However, this has been done for purposes of clarity and example only. In certain cases, it may be easier to describe one or more of the functionalities of a given set of flows by only referencing a limited number of items. It should be appreciated that communication system 10 (and its teachings) are readily scalable and can accommodate a large number of components, as well as more complicated or sophisticated arrangements and configurations. Accordingly, the examples provided should not limit the scope or inhibit the broad teachings of communication system 10 as potentially applied to a myriad of other architectures.

It is also important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the discussed concepts. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the discussed concepts. Along a similar rationale, the preceding flows and FIGURES have annunciated specific rules or commands for addressing certain traffic or processing scenarios, but these are simply offering possible (not required) guidelines for achieving the operational capabilities tendered herein. There is considerable flexibility in how these activities can be conducted and any such pronouncements (as earnestly offered in this Specification) should not be construed to limit the broad scope or the framework presented in FIGS. 1-23.

Numerous other changes, substitutions, variations, alterations, and modifications may be ascertained to one skilled in the art and it can be intended that the discussed concept encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An apparatus comprising:
a network element configured to:
receive a plurality of packets;
generate a data record based on information associated with the packets and capable of being interpreted according to a template in which multiple information elements can be positioned to create a hierarchical relationship within structured data; and
export the data record to a next destination via an internet protocol (IP) flow Information eXport (IPFIX) module, wherein the information elements correspond to respective abstract data types that include a basic List, a sub-Template List, which references one of a plurality of templates, and a sub-Template multi-list, which references one or more of the templates and which includes multiple lists of data, and wherein the structured data is a variable-length list that specifies a hierarchical relationship between several of the templates.

2. The apparatus of claim 1, wherein the network element is configured to generate multiple templates and each of the templates is referenced by the structured data.

3. The apparatus of claim 1, wherein an export protocol that is configured to trigger the generation of the data record specifies, for each of the information elements, a numeric identifier, an abstract data type, and an encoding mechanism for abstract data types.

4. The apparatus of claim 1, wherein the data record is received at a network management station configured to interpret the data records according to the template, and wherein the network management station is configured to create reports, statistical analysis, or diagnostic evaluations based on the data record.

5. The apparatus of claim 1, wherein the information elements are sent in a canonical format in network-byte order.

6. A method, comprising:
receiving a plurality of packets;
generating a data record that is based on information associated with the packets and that is interpreted according to a template in which multiple information elements can be positioned to create a hierarchical relationship within structured data; and
exporting the data record to a next destination via an internet protocol (IP) flow Information eXport (IPFIX) module, wherein the information elements correspond to respective abstract data types that include a basic List, a sub-Template List, which references one of a plurality of templates, and a sub-Template Multi-List, which references one or more of the templates and which includes multiple lists of data, and wherein the structured data is a variable-length list that specifies a hierarchical relationship between several of the templates.

7. The method of claim 6, further comprising:
generating multiple templates, wherein each of the templates is referenced by the structured data.

8. The method of claim 6, wherein an export protocol that is configured to trigger the generation of the data record specifies, for each of the information elements, a numeric identifier, an abstract data type, and an encoding mechanism for abstract data types.

9. The method of claim 6, wherein the data record is generated in response to a request for variable data from a network security element.

10. The method of claim 6, wherein the data record is received and the template is evaluated to create reports, statistical analysis, or diagnostic evaluations based on the data record.

11. The method of claim 6, wherein the information elements are sent in a canonical format in network-byte order.

12. An apparatus, comprising:
a network management station configured to:
receive a data record that is exported from an internet protocol (IP) flow Information eXport (IPFIX) module and that is interpreted according to a template in which multiple information elements can be positioned to create a hierarchical relationship within structured data, and wherein the structured data further includes references to the information elements, wherein the information elements correspond to respective abstract data types that include a basic List, a sub-Template List, which references one of a plurality of templates, and a sub-Template Multi-List, which references one or more of the templates and which includes multiple lists of data, and wherein the structured data is a variable-length list that specifies a hierarchical relationship between several of the templates.

13. The apparatus of claim 12, wherein the network management station is configured to receive multiple templates and each of the templates is referenced by the structured data.

14. The apparatus of claim 12, wherein an export protocol that is configured to trigger generation of the data record specifies, for each of the information elements, a numeric identifier, an abstract data type, and an encoding mechanism for abstract data types.

15. The apparatus of claim 12, wherein the network management station is configured to create reports, statistical analysis, or diagnostic evaluations based on the data record.

16. A method, comprising:
receiving a data record that is exported from an internet protocol (IP) flow Information eXport (IPFIX) module and that is interpreted according to a template in which multiple information elements can be positioned to create a hierarchical relationship within structured data, and wherein the structured data further includes references to the information elements; and
creating reports, statistical analysis, or diagnostic evaluations based on the data record, wherein the information elements correspond to respective abstract data types that include a basic List, a sub-Template List, which references one of a plurality of templates, and a sub-Template Multi-List, which references one or more of the templates and which includes multiple lists of data, and wherein the structured data is a variable-length list that specifies a hierarchical relationship between several of the templates.

17. The method of claim 16, further comprising:
receiving multiple templates, wherein each of the templates is referenced by the structured data.

18. The method of claim 16, wherein the data record is generated in response to a request for variable data from a network security element.

* * * * *